United States Patent
Gruber et al.

(10) Patent No.: US 9,764,540 B2
(45) Date of Patent: Sep. 19, 2017

(54) LABEL FOR MARKING ITEMS

(71) Applicant: S+P Samson GmbH, Kissing (DE)

(72) Inventors: Franz Gruber, Augsburg (DE); Udo Kahlenberg, Seeshaupt (DE); Wolfgang Jelinek, Schrobenhausen (DE); Michael Boisson, Gauting (DE)

(73) Assignee: S+P Samson GmbH, Kissing (DE)

( * ) Notice: Subject to any disclaimer, the term of this patent is extended or adjusted under 35 U.S.C. 154(b) by 145 days.

(21) Appl. No.: 14/278,715

(22) Filed: May 15, 2014

(65) Prior Publication Data

US 2014/0342112 A1   Nov. 20, 2014

(30) Foreign Application Priority Data

May 16, 2013 (EP) .................................. 13168082

(51) Int. Cl.
| | |
|---|---|
| *B32B 38/04* | (2006.01) |
| *G09F 3/00* | (2006.01) |
| *G09F 3/10* | (2006.01) |
| *G06K 19/06* | (2006.01) |
| *G09F 23/00* | (2006.01) |
| *G09F 3/02* | (2006.01) |
| *B31D 1/02* | (2006.01) |

(52) U.S. Cl.
CPC ............. *B32B 38/04* (2013.01); *B31D 1/021* (2013.01); *G06K 19/06028* (2013.01); *G06K 19/06037* (2013.01); *G06K 19/06046* (2013.01); *G09F 3/02* (2013.01); *G09F 3/0297* (2013.01); *G09F 3/10* (2013.01); *G09F 23/00* (2013.01); *B32B 2038/042* (2013.01); *B32B 2038/047* (2013.01); *B32B 2307/75* (2013.01); *B32B 2405/00* (2013.01); *G09F 2003/0202* (2013.01);

(Continued)

(58) Field of Classification Search
CPC ............. B32B 38/04; B32B 2038/042; B32B 2038/047; B32B 2307/75; B32B 2405/00; B31D 1/021; G06K 19/06028; G06K 19/06037; G06K 19/06046; G09F 3/02; G09F 3/0297; G09F 3/10; G09F 23/00; G09F 2003/0202; G09F 2003/0211; G09F 2003/0229; G09F 2003/0232; G09F 2003/0233; G09F 2003/025; Y10T 428/14; Y10T 428/24851; Y10T 428/2817; Y10T 428/2848; Y10T 156/1052; Y10T 156/1057; Y10T 156/1084

See application file for complete search history.

(56) References Cited

U.S. PATENT DOCUMENTS

| | | | | |
|---|---|---|---|---|
| 5,240,789 A | * | 8/1993 | Breen | ......... G09F 3/02 40/626 |
| 5,770,296 A | * | 6/1998 | Remerowski | ......... C09J 5/06 219/633 |
| 6,740,379 B1 | * | 5/2004 | Congard | ......... C09J 7/0246 156/247 |

(Continued)

FOREIGN PATENT DOCUMENTS

| | | |
|---|---|---|
| DE | 21 2008 000 085 U1 | 11/2008 |
| DE | 102012224310 A1 * | 6/2014 ............. C09J 7/026 |

(Continued)

*Primary Examiner* — Patricia L Nordmeyer
(74) *Attorney, Agent, or Firm* — Bookoff McAndrews, PLLC

(57) ABSTRACT

The present invention relates to a label for marking items comprising a carrier material with a top side and a bottom side. The carrier material is printable at least on the top side. Adhesive layers are provided on the bottom side and the top side, wherein at least the adhesive layer provided on the top side can be activated for example by heat.

20 Claims, 3 Drawing Sheets

(52) U.S. Cl.
CPC .......... *G09F 2003/025* (2013.01); *G09F 2003/0211* (2013.01); *G09F 2003/0229* (2013.01); *G09F 2003/0232* (2013.01); *G09F 2003/0233* (2013.01); *G09F 2003/0255* (2013.01); *G09F 2003/0257* (2013.01); *Y10T 156/1052* (2015.01); *Y10T 156/1057* (2015.01); *Y10T 156/1084* (2015.01); *Y10T 428/14* (2015.01); *Y10T 428/24851* (2015.01); *Y10T 428/2817* (2015.01); *Y10T 428/2848* (2015.01)

(56) References Cited

U.S. PATENT DOCUMENTS

| | | | | |
|---|---|---|---|---|
| 7,855,647 | B2* | 12/2010 | Fronek | G06K 19/07749 235/375 |
| 8,236,126 | B2* | 8/2012 | Chen | B32B 37/185 156/145 |
| 2003/0001381 | A1 | 1/2003 | Riley | |
| 2004/0202812 | A1* | 10/2004 | Congard | B42D 5/027 428/40.1 |
| 2015/0337174 | A1* | 11/2015 | Keite-Telgenbuscher | C09J 7/026 428/138 |

FOREIGN PATENT DOCUMENTS

| | | |
|---|---|---|
| WO | WO 90/00788 A1 | 1/1990 |
| WO | WO 01/17766 A1 | 3/2001 |
| WO | WO 02/055295 A1 | 7/2002 |
| WO | WO 2009/095027 A1 | 8/2009 |

\* cited by examiner

LABEL FOR MARKING ITEMS

The present invention relates to a label for marking items, in particular surgical instruments, sheet material with a plurality of the labels to be taken from the sheet material, wherein the labels can already be printed or be provided printable for printing by the final user, as well as methods for manufacturing said labels.

Hospitals or doctor's offices which also conduct surgeries usually use a large stock of surgical instruments that has to be permanently re-assorted. Hence, e.g., for every specific surgery special instruments are assorted and already prepared before the surgery to be used therein. Different surgeons often desire different surgical instruments for the same type of surgery. The surgical instruments for a certain surgery and/or a certain surgeon is generally assorted and prepared by, e.g., a surgical nurse. This requires on the one hand trained staff which is able to prepare suitable surgical instruments for each case without errors. On the other hand, the manual search for the various parts of the surgical instruments causes additional costs due to the time involved therein.

Therefore, surgical instruments and/or their components need to be marked appropriately so that by means of the marking the surgical instruments for each case can either be provided automatically or can be manually assorted in a simple way by means of a check list. As said allocation can change during the course of time, for example because of changing preferences of the surgeons or a change of staff in the team of surgeons, said markings should be able to be applied to the surgical instruments in an simple way. Furthermore, said markings should be suited to outlast a plurality of sterilization processes and fulfill the usual requirements for medical apparatuses.

DE 21 2008 000 085 U1 describes a marking system for marking, e.g., a medical instrument. The marking system comprises a holding system for the item to be marked, a marking element, a drilling means for inserting a receiving hole for the marking element into the item to be marked and a pressing means for pressing the marking element into the hole. The marking element can for example be made of polyetheretherketone (PEEK) in which for example a barcode or 2D-code is inserted or grouted. Installing said marking element takes, however, obviously huge efforts. Further, said marking element cannot be removed from the medical instrument without leaving durable marks. Therefore, the marking system described in DE 21 2008 000 085 U1 does not fulfill the requirements discussed above.

It is therefore an object of the present invention to provide a label for marking items, which in particular complies with rough environmental conditions, as they occur for example when sterilizing surgical instruments. Further, it should be made possible in a simple-to-use and easy way to supply such labels to a final user, to store them and to be used by the final user. A further object is to provide methods for manufacturing labels that fulfill such requirements.

These and further objects are achieved by the labels, sheet materials, applications and manufacturing methods defined in the claims. Preferred embodiments are described in the dependent claims.

The invention, i.a., relates to a label for marking items, in particular surgical instruments or surgical items, comprising carrier material having a top side and a bottom side, wherein the carrier material serving as data carrier is printable or printed at least on the top side. Further, the label comprises an adhesive layer provided on the bottom side of the carrier material as well as an adhesive layer provided on the top side. At least the adhesive layer provided on the top side comprises an adhesive or consists of an adhesive which is in a non-activated state and can be activated by means of an activation mechanism.

The activation of the adhesive can be achieved for example by radiant energy, e.g., thermal radiation, infrared radiation, ultraviolet radiation or other electromagnetic radiation or other mechanisms. Appropriate adhesives are in particular cross-linking adhesives, for example on the basis of epoxy resin, by means of which a permanent adhesion can be achieved.

Preferably, the adhesives provided on the bottom side and on the top side are compatible in a way that they connect with each other. In particular, the adhesives provided on the bottom side and on the top side are of the same kind, for example the same class of adhesives or preferably the same adhesive. Preferably, also the adhesive provided on the bottom side can be activated.

The adhesives provided on the bottom side and on the top side are changeable as regards their viscosity preferably by means of activation at least such that they exit beyond an outer edge of the label and come into contact with each other in a way that the layer(s) of the label that lie in-between, in particular the carrier material and a print image provided thereon, are encapsulated by both adhesive layers. Thereby, activation is usually effected when the label is attached to an item to be marked so that the label is adhered to the item by means of the adhesive provided on the bottom side, and in the context of activation, which is required for adhering the label to the item, also the adhesive layer provided on the top side dilutes in a way that it exits beyond the outer area or the outer edge of the label and comes into contact with the adhesive layer of the bottom side which also exits beyond the outer edges of the label and thus the label is essentially completely attached to the item and sealed.

Both adhesive layers guarantee that a sealing of the label when being attached to an item is made possible, by which sealing for example delamination of the individual layers of the label is efficiently prevented. This is achieved in particular by sealing the side edges of the label, which is effected by the connected or blended adhesive layers of the top side and bottom side of the label.

It is particularly preferred that the adhesive provided on the top side and preferably also the adhesive provided on the bottom side can be activated by means of heat, UV radiation or other electromagnetic radiation (or other mechanisms) so that the adhesive cures. This can advantageously be achieved by a poly reaction, for example a poly addition reaction.

According to a preferred embodiment, the carrier material can be printed on the top side already during the manufacturing process, for example with a barcode, 2D code or another encoding. Thus, the label can for example be used as data carrier. Alternatively, the label can be printed later, for example by the user, wherein in this case the adhesive layer provided on the top side of the carrier material is only applied by the user after printing in order to cover and seal the print image by the top adhesive layer.

The carrier material can be for example a film or can consist of a combination of the following materials: polyethylene terephathalate (PET), polyetheretherketone (PEEK), polyetherimide (PEI), polyimide (PI), copolycarbonates (COC), polyphenylene sulfide (PPS), sulfone polymer and polysulfone. PEEK for example has properties such as high temperature resistance and resistance to almost all organic and inorganic chemical products. Further, PEEK can be sterilized repeatedly and is biocompatible, for which reason the material is also suitable for use in medical engineering. Similar is true for PET, PEI, PI, COC, PPS and sulfone polymer.

On the bottom side and/or top side of the label a removable cover material or a liner (sheeting) can be provided. Said liner can be for example a PET film or silicone paper.

A further aspect of the invention is directed to a sheet material comprising a plurality of labels, in particular labels as described above. The labels are removably and/or separably arranged on a liner with an adhesive layer provided on the bottom side of the labels. Preferably, the sheet material is provided as roll.

For producing the inventive sheet material a carrier material can be provided as sheet which has adhesive layers on the bottom side and the top side, wherein the individual labels can be removed or separated from the sheet material by lines of weakness, for example perforations. For example, the individual labels in the sheet material are punched out in a way that the carrier material with the adhesive layers on the top side and bottom side as well as the print on the top side is adhesively attached to the liner, wherein the liner preferably simultaneously serves as handling means. After affixing the label onto an item to be marked, the liner can be removed from the label, in particular from the adhesive-coated top side of the carrier material and subsequently be sealed by activating the adhesive(s) on the item.

The present invention further relates to a method for manufacturing labels, in particular the labels described above comprising the steps of: providing a (data-) carrier sheet with a printable top side and a bottom side, wherein an adhesive layer is provided on the bottom side; printing the top side with a marking; applying an adhesive layer onto the printed top side of the carrier sheet; and punching out or cutting out individual labels from the carrier sheet.

Preferably, this method comprises a step of providing a liner to the adhesive layer provided on the bottom side of the carrier sheet, wherein the carrier sheet is provided together with the adhesive-coated bottom side and the liner. The provision of the adhesive layer on the top side of the carrier sheet is preferably achieved by applying an adhesive layer on a liner in the form of a transfer film or transfer sheet which is then liner to the top side of the carrier sheet. The lamination of the transfer film is preferably removed after lamination before punching. The method further comprises a step of applying a liner onto the adhesive layer on the top side of the carrier sheet.

This manufacturing process has the purpose of providing sheet material with a plurality of printed labels that can immediately be used by the final user.

Alternatively, the present invention relates to a method of manufacturing label blanks for marking items, which are printed by the user and not during the manufacturing process. This method in particular comprises the steps of: providing a liner; providing an adhesive layer on the liner; arranging a carrier sheet with a printable top side and a bottom side on the adhesive-coated liner; and arranging a further liner adjacent to the carrier sheet on the adhesive-coated liner. Preferably, the adhesive layer is provided together with the liner.

Preferably, print windows for later printing by the user are provided on the printable top side of the carrier sheet and on the further liner corresponding adhesion windows are provided, wherein the print windows and/or adhesion windows are preferably punched out.

It is preferred to provide a fold line between the print windows and the adhesion windows so that each label blank comprises a print window and an adhesion window which can be folded onto each other along the fold line in order to align the adhesive layer of the adhesion window with the printable top side of the print window.

The method can comprise the further step of perforating for producing (i) separation lines for separating the label blanks, (ii) print windows, (iii) adhesion windows and/or the fold line.

The film used for example as carrier material in the context of the invention is made of PET, PEEK, PEI, PI, COC, PPS and/or sulfonepolymer and can be printed in an easy way despite its surface properties. Suitable therefor are conventional printing technologies, even printing with a standard office printer (e.g. thermal transfer printer or ink jet printer) is possible. In this way a label for e.g. surgical instruments can be produced by printing a carrier material with the desired information with the help of simple means that are available in each hospital or in each doctor's office. The label can then be attached on site to the surgical instruments or their individual parts in order to provide the respective reference for the sorting and provision of surgical instruments as discussed above. Alternatively or in combination therewith, also already printed labels can be supplied, which are then attached to the surgical instruments on site.

The carrier material is printed with information in the broadest sense, preferably with characters and/or symbols and/or a barcode and/or a 2D-code and/or with a similar symbology or encoding. The information can be contained in printed or unprinted areas in a coded way or in characters of different colors. The carrier material can be transparent, translucent or opaque.

The inventive label makes it possible that the print image provided on the carrier material is completely protected by the provided adhesive layers and simultaneously delamination of the individual layers of the label is prevented by the sealing which is achieved by activating and curing both adhesive layers.

In the following, preferred embodiments of the invention are exemplarily described by the figures.

Figure 1:
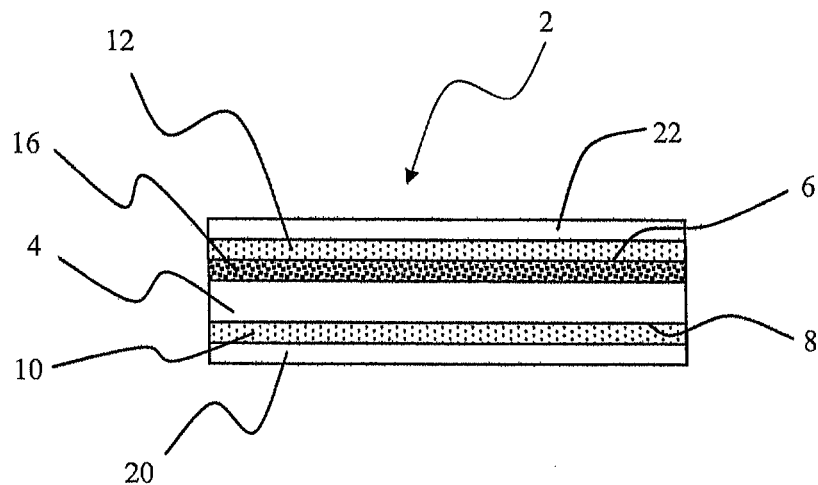
FIG. 1 shows a schematic side view of an embodiment of an inventive label before it is affixed to an item.

The embodiment of an inventive label 2 shown in FIG. 1 is in particular suitable for marking items like surgical instruments, tools or components of machine tools. The inventive label 2 comprises a carrier material 4 with a top side 6 and a bottom side 8. The carrier material 4 is printable at least on the top side 6 so that information suitable for marking can be printed on the carrier material 4. On the bottom side 8 of the carrier material 4 an adhesive layer 10 is provided and an adhesive layer 12 is arranged on the opposite top side 6. The adhesive layer 12 on the top side 6 of the carrier sheet 4 is formed by an adhesive that can be activated.

Preferably, also the adhesive forming the adhesive layer 10, which is provided on the bottom side 8 of the carrier material 4 can be activated. According to a preferred embodiment, the adhesives of the adhesive layers 10, 12 provided on the bottom side 8 and the top side 6 are compatible in a way that they are connected after the adhesive or adhesives have been activated. For this, it is preferred that the adhesives on the bottom side 8 and the top side 6 are of the same kind. It is particularly preferred that the adhesives provided on the bottom side 8 and the top side 6 are identical.

The adhesives provided on the bottom side 8 and the top side 6 can advantageously be influenced by activation in such a way that they change their flow properties and/or their viscosity. According to one embodiment of the invention, the adhesive is applied as adhesive layers 10 and 12 on the bottom side 8 and top side 6, respectively, of the carrier sheet 4 by means of laminating. In the applied form the adhesive is relatively tenacious or tough and has thus a high viscosity. By means of activation, for example when or after applying the label 2 on an item to be marked, viscosity is reduced so that advantageously a certain flow behavior in the adhesive layer(s) is reached.

Figure 2:
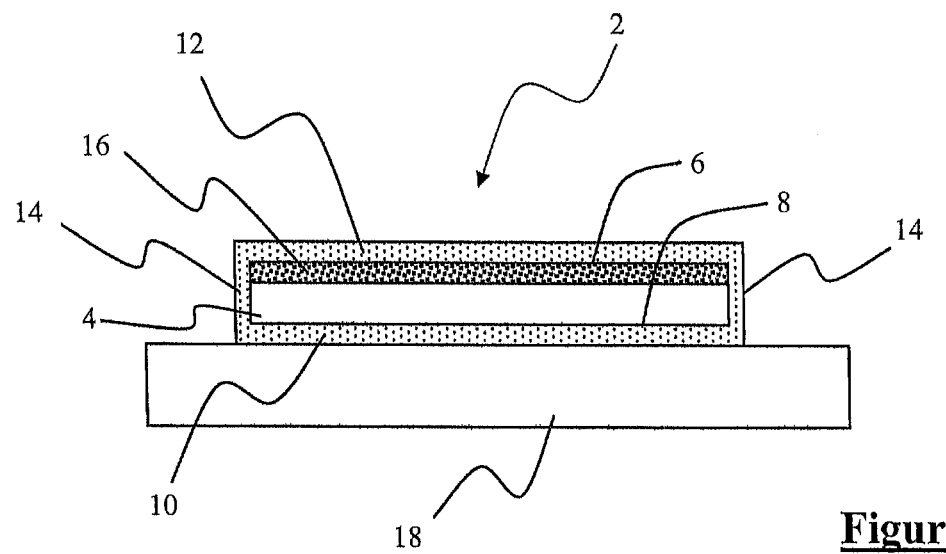
FIG. 2 shows a schematic side view of the label of FIG. 1 after it has been affixed to an item.

According to the invention, viscosity is adjusted by activation advantageously in such a way that at least the adhesive layer 12 provided on the top side 6 exits beyond an outer surface or outer edges of the label 2 and forms adhesive areas 14 at the side surfaces which encapsulate and/or seal the layers provided between the upper adhesive layer 12 and the lower adhesive layer 10, namely the carrier material 4 and a print image 16 provided thereon. This is schematically shown in FIG. 2. Thereby, the inventive label 2 is attached to an item 18 by means of the lower adhesive layer 10. A label 2 which is sealed in such a way is perfectly protected against rough environmental conditions as they occur for example when sterilizing surgical instruments and thus permanent marking is guaranteed. Further, the sealing is an effective protection against mechanical damages, in particular delamination.

In the configuration in which it is supplied, i.e. before attaching it to an item, label 2 can comprise a removable lamination material 20, 22 on the adhesive layer 10 of the bottom side 8 and/or on the adhesive layer 12 of the top side 6. Such liners serve in particular as protection and for an easier handling of the label 2. Appropriate liners are for example silicone paper, PET liner or further suitable materials which can easily be removed from the adhesive layers 10, 12. In particular, it is preferred to cover the bottom adhesive layer 10, which is provided for attachment to an item 18 via a silicone paper and to provide the top adhesive layer 12, which is part of the sealing after being attached to an item 18, with a dehesive PET liner.

The inventive labels 2 are preferably provided in an endless manufacturing process as sheet material 24, wherein the carrier material 4 is initially provided as sheet which is adhesive-coated on its bottom side and top side in order to form the lower adhesive layer 10 and the upper adhesive layer 12. The individual labels 2 are removable and/or separable from the sheet material 24. Therefor, preferably for example perforations 26 are provided in the sheet material 24. This is schematically shown in FIG. 3.

Preferably, the sheet material is provided with a liner, wherein the carrier sheet is removed after punching out individual labels. Thereby, the labels remain on the liner with their adhesive layer provided on the bottom side of the carrier.

Figure 3:
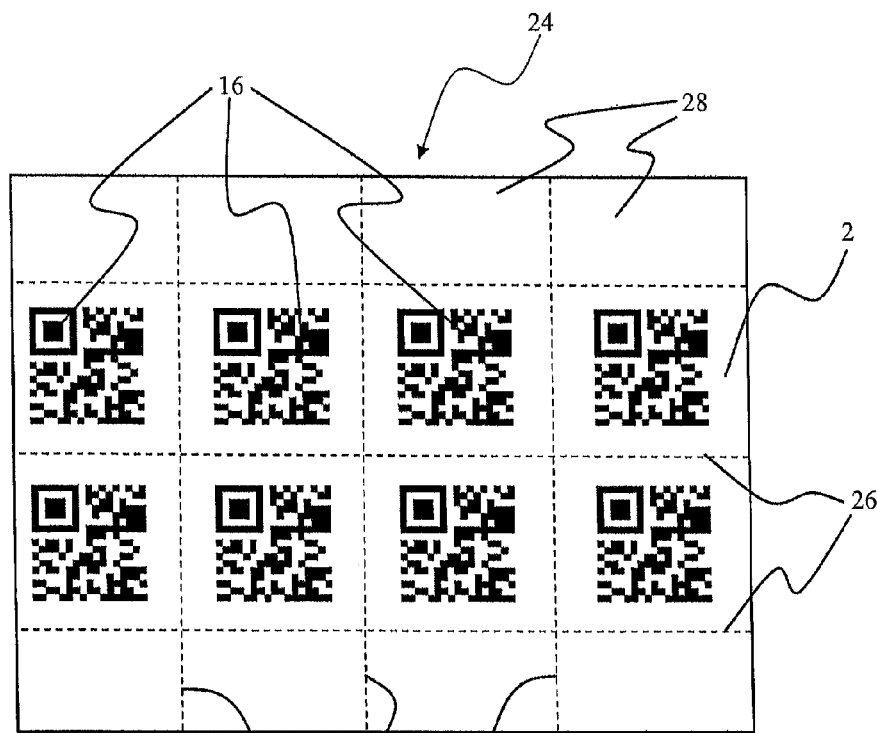
FIG. 3 shows a schematic upper view of a section of an inventive sheet material having a plurality of inventive labels.

In the embodiment shown in FIG. 3 of the inventive sheet material 24, a removable handling tab 28 is assigned to each label 2, with which the labels 2 can be easily affixed to an item 18 to be labeled. After affixing a label 2 to an item 18 to be labeled the handling tab 28 can for example be easily separated along the perforation 26. Subsequently, the activation of the top and/or bottom adhesive layer and thus the sealing of the label 2 can be effected.

Figure 4:
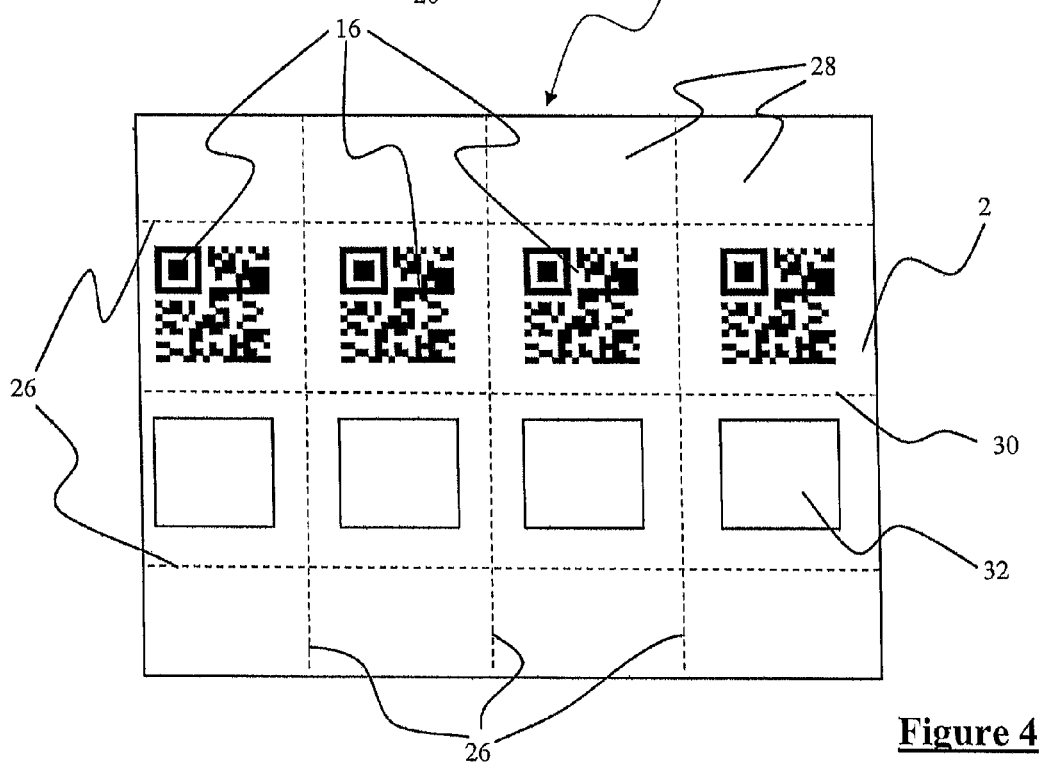
FIG. 4 shows a schematic upper view of an alternative embodiment of an inventive sheet material with an alternative embodiment of a plurality of inventive labels.

A further embodiment of the inventive sheet material 24 with inventive labels 2 is shown in FIG. 4. In the embodiment shown in FIG. 4 the labels 2 are not printed directly when manufacturing them, rather the labels are prepared for being printed later on by the user. Therefor, the labels 2 provided on the sheet material 24 also comprise a carrier material 4 which can be printed on the top side. In FIG. 4 a print image 16 is shown for better illustration, which is, however, not applied when manufacturing the sheet material but, as explained above, by the user. The print images 16 of the individual labels 2 are provided in the area of print windows (not shown), wherein the print window on each label can also extend to the whole top side of the carrier material 4 of each label.

This embodiment of the label and/or the sheet material 24 provides a folding line 30 in longitudinal direction of the sheet by means of which a first label area comprising the print window and a second label area comprising an adhesion window 32 can be folded upon each other. Thereby, after printing by the user, the adhesion window 32, which can also extend over the whole surface of the second label area, can be affixed on the first label area so that a configuration of a label 2 is provided, as shown in FIG. 1.

The adhesion window 32 has the purpose to provide the upper adhesive layer 12 on the carrier material 4 of the top side 6, which has been printed by the user, as shown in FIG. 1. The bottom side of the sheet material 24 according to FIGS. 3 and 4 is already coated with the adhesive layer 10. The "windows" shown in FIG. 4, i.e. the print windows and adhesion windows, are shown only for explanatory reasons and are not necessarily parts of the sheet material and/or label. In other words, a label 2 which is removed from the sheet material 24 according to the embodiment shown in FIG. 4 is configured in the same manner as it is shown in FIG. 1 after applying the top adhesive layer 12 by folding along the folding line 30. Therefor, it may be advantageous to provide on the carrier material in the area of the adhesion windows 32, i.e. in the embodiment shown in FIG. 4 below the folding line 30, means for detaching the adhesive provided in the adhesion windows forming the upper adhesive layer 12 in the label. These means may be formed for example by a liner, as described above.

In the following, a preferred embodiment of a method for manufacturing the inventive labels 2 is described in connection with FIG. 5. The manufacturing process described is a continuous process wherein the labels of the present invention may be produced also with other manufacturing processes, in particular not continuous processes.

Figure 5:
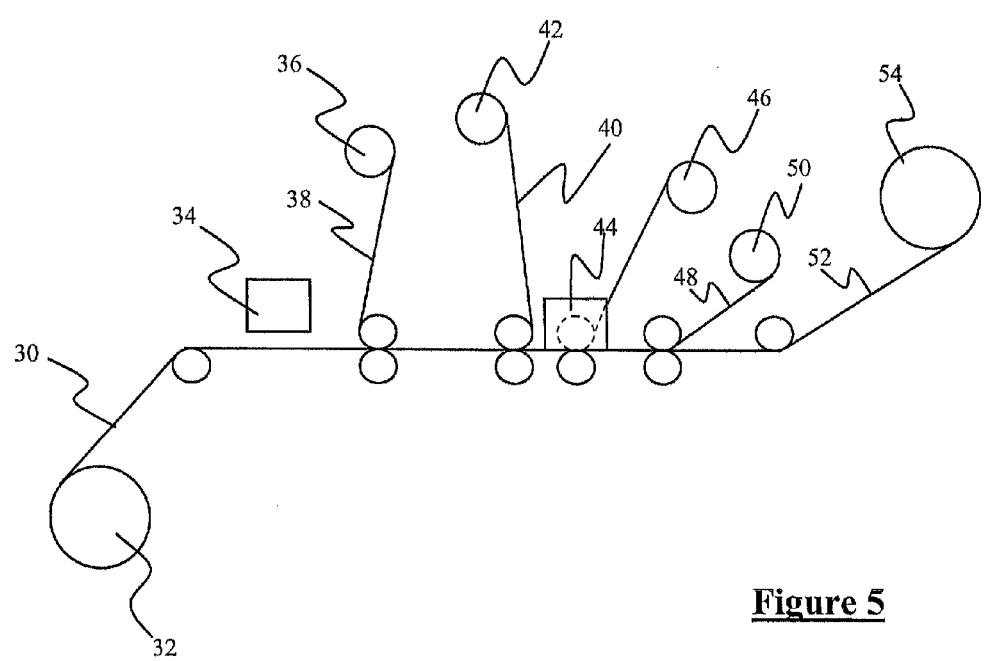
FIG. 5 shows a schematic illustration for describing the inventive manufacturing processes for labels.

In the manufacturing plant schematically shown in FIG. 5 initially a carrier sheet 30 is supplied from a roll 32. According to the embodiment shown, the carrier sheet 30 is already provided with an adhesive layer on its bottom side. The adhesive layer could alternatively also be applied to the carrier sheet during the manufacturing process. If the lower adhesive layer on the carrier sheet 30 is already present at the time of supply, for example, a liner on the bottom side of the carrier sheet 30 may be provided so that the sheet 30 can be smoothly unwound from the roll 32. The liner can be realized for example via a separate liner material which is applied as sheet on the lower adhesive layer. In a preferred embodiment, said compound of carrier sheet 30, lower adhesive layer and liner material is introduced into the manufacturing plant as shown in FIG. 5.

Subsequently, the carrier sheet 30 is fed to a schematically shown print means 34, which provides a print image 16 on the top side of the carrier sheet 30. According to an alternative embodiment no printing of the top side of the carrier sheet 30 takes place. Hence, the print means 34 is optional.

In the embodiment shown in FIG. 5, according to which the top side of the carrier sheet 30 is printed, the upper adhesive layer is laminated onto the carrier sheet after printing. For this, an adhesive provided on a transfer film 38 is laminated from a stock sheet 36 to the top side of the carrier sheet 30. The transfer film 38 carries the adhesive film, forming the adhesive layer 12 in the finished label. The adhesive film is preferably provided on a liner 40 which is removed after lamination and wound for example on a sheet 42. At this time the laminate consists of the carrier sheet, the print, the upper and lower adhesive layers as well as of the liner provided on the lower adhesive layer.

This laminate is subsequently fed to a punching means 44 which may be provided for example as a rotary die-cutter. As the liner 40 has already been removed at this point of time, it is punched into the open or exposed upper adhesive layer. In the illustrated embodiment, the part of the carrier sheet 30 which lies beyond the individual labels is removed from the laminate and wound onto a roll 46. In this state, the labels 2 are carried on the liner of the lower adhesive layer, which has originally been supplied together with the carrier sheet 30. On the top side of the sheet subsequently an upper liner 48 can optionally be supplied from a roll 50. Finally, the inventive sheet material 52 together with the labels 2 provided thereon is wound to a roll 54 for further use.

For manufacturing the inventive sheet material 24 according to the embodiment shown in FIG. 4 no printing takes place during manufacturing. As an alternative to the manufacturing process described above, the upper adhesive layer is preferably not applied via a transfer film 38 according to this embodiment. Rather, it is preferred to provide the lower adhesive layer on a liner which is wider than the carrier sheet, for example approximately twice as wide. The structure of the initial sheet material accordingly has a lower liner with an adhesive layer provided thereon, wherein the adhesive layer has a carrier sheet provided approximately from the edge of the sheet to the center of the sheet or a folding line 30 which is provided later. On the other side of the folding line towards the opposite edge of the sheet material an upper liner is provided. In this configuration perforations in the sheet material may be provided in order to form the print and/or adhesion windows, to be able to separate individual labels from each other and/or to form the folding line. The sheet material is then preferably wound as a roll. The user can unwind the roll, print it and apply the upper adhesive layer before applying the labels to an item to be labeled.

With the inventive label, sheet material and manufacturing process significant advantages can be achieved; in particular it is made possible to affix labels permanently to items which are subject to extreme demands or rough environmental conditions. Thus, a completely new field of use for adhesive labels opens.

The invention claimed is:

1. A label for marking an item, the label comprising:
   a data carrier with a top side and a bottom side, the data carrier including data associated with the item;
   an adhesive layer provided on the bottom side; and
   an adhesive layer provided on the top side; wherein the adhesive layers provided on the bottom side and the top side are configured to be activated to exit beyond an outer circumference of the data carrier and contact each other to encapsulate the data carrier, and wherein the adhesive layers provided on the bottom side and the top side are spaced apart from each other prior to activation.

2. The label according to claim 1, wherein the adhesives on the bottom side and the top side connect to each other upon activation.

3. The label according to claim 1, wherein the adhesives provided on the bottom side and on the top side are of the same type or are the same adhesives.

4. The label according to claim 1, wherein the adhesive provided on the top side and optionally the adhesive provided on the bottom side are configured to be activated by heat and thus cure.

5. The label according to claim 1, wherein the data carrier includes a feature configured to encode the data associated with the item.

6. The label according to claim 1, wherein the data carrier comprises a film that includes one or a combination of the following materials: polyethylene terephthalate (PET), polyetheretherketone (PEEK), polyetherimide (PEI), polyimide (PI), copolycarbonates (COC), polyphenylene sulfide (PPS), sulfone polymer, and polysulfone.

7. The label according to claim 1, wherein the data is encoded.

8. The label according to claim 1, wherein the data includes electronically-stored information associated with the item.

9. The label according to claim 1, wherein the data carrier is configured to receive printed data.

10. The label according to claim 5, wherein the feature includes a barcode or a 2D-code.

11. The label according to claim 1, wherein the adhesive layers on the bottom side and the top side extend only to a periphery of the data carrier prior to the activation.

12. Use of the label according to claim 1, for individualized marking of surgical instruments.

13. A label for marking an item, the label comprising:
   a data carrier with a top side and a bottom side, the data carrier being configured to electronically store data associated with the item;
   a first adhesive layer provided on the bottom side, wherein the first adhesive layer includes epoxy resin; and
   a second adhesive layer provided on the top side, wherein the second adhesive layer includes epoxy resin, wherein the first and second adhesive layers are configured to be activated to exit beyond an outer circumference of the data carrier and come into contact with each other to encapsulate the data carrier, and wherein the adhesive layers provided on the bottom side and the top side are spaced apart from each other prior to activation.

14. The label of claim 13, further comprising a removable liner provided on at least one of the first or second adhesive layers.

15. A sheet material with a plurality of labels according to claim 13, wherein the labels are arranged with the first adhesive layer removably coupled to a liner.

16. The label of claim 13, wherein the first and second adhesive layers connect to each other upon activation.

17. The label of claim 13, wherein the first and second adhesive layers are configured to be activated by at least one of heat or UV radiation.

18. The label of claim 13, wherein the data carrier includes at least one of a barcode or a 2D code.

19. The label of claim 13, wherein the adhesives of the first and second adhesive layers are identical.

20. A sheet material comprising:
a plurality of labels for marking items, each of the labels comprising:
- a data carrier with a top side and a bottom side;
- a first adhesive layer provided on the bottom side, wherein the first adhesive layer includes epoxy resin; and
- a second adhesive layer provided on the top side, wherein the second adhesive layer includes epoxy resin, wherein the first and second adhesive layers are configured to be activated to exit beyond an outer circumference of the data carrier and come into contact with each other to encapsulate the data carrier, and wherein the adhesive layers provided on the bottom side and the top side are separated from each other prior to activation; and a liner, wherein the labels are arranged with the first adhesive layer removably coupled to the liner.

\* \* \* \* \*